US009647517B2

(12) United States Patent
Kurosaki

(10) Patent No.: US 9,647,517 B2
(45) Date of Patent: May 9, 2017

(54) MANUFACTURING METHOD FOR HELICAL CORE FOR ROTATING ELECTRICAL MACHINE AND MANUFACTURING DEVICE FOR HELICAL CORE FOR ROTATING ELECTRICAL MACHINE

(75) Inventor: Yousuke Kurosaki, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 269 days.

(21) Appl. No.: 13/995,280

(22) PCT Filed: Jan. 28, 2011

(86) PCT No.: PCT/JP2011/051732
§ 371 (c)(1),
(2), (4) Date: Jun. 18, 2013

(87) PCT Pub. No.: WO2012/101812
PCT Pub. Date: Aug. 2, 2012

(65) Prior Publication Data
US 2013/0276297 A1    Oct. 24, 2013

(30) Foreign Application Priority Data

Oct. 7, 2009   (JP) ................................. 2009-233774
Feb. 22, 2010  (JP) ................................. 2010/036375

(51) Int. Cl.
H02K 15/02    (2006.01)
H02K 1/14     (2006.01)

(52) U.S. Cl.
CPC ............. *H02K 15/02* (2013.01); *H02K 1/148* (2013.01); *H02K 15/022* (2013.01);
(Continued)

(58) Field of Classification Search
CPC ....................................................... H02K 15/02
(Continued)

(56) References Cited

U.S. PATENT DOCUMENTS 2,565,530 A * 8/1951 Smith ...................... H02K 3/48
                                                    29/598
5,986,377 A * 11/1999 Yamada .................. H02K 1/148
                                                    310/216.013
(Continued)

FOREIGN PATENT DOCUMENTS

CN       1196598      10/1998
CN       1316715      5/2007
(Continued)

OTHER PUBLICATIONS

International Search Report dated Apr. 12, 2011, issued in corresponding PCT Application No. PCT/JP2011/051732.
(Continued)

*Primary Examiner* — Peter DungBa Vo
*Assistant Examiner* — Kaying Kue
(74) *Attorney, Agent, or Firm* — Birch, Stewart, Kolasch & Birch, LLP

(57) ABSTRACT

A manufacturing method of a helical core for a rotating electrical machine includes: first step forming a yoke portion extending along one direction and tooth portions protruding toward a width direction of the yoke portion from a first side edge of the width direction, with respect to a belt-shaped metal plate extending along the one direction; second step forming a notch at a position between tooth portions of the yoke portion after the first step; and third step processing the belt-shaped metal plate into a helical shape by applying bending to the metal plate so that the belt-shaped metal plate is curved toward the width direction sequentially from a portion where the notch is formed after the second step, and
(Continued)

in the third step, a distance between a position where the application of bending starts and the position where the notch is formed is limited to within a predetermined dimension.

6 Claims, 8 Drawing Sheets

(52) U.S. Cl.
CPC ...... *H02K 15/026* (2013.01); *Y10T 29/49009* (2015.01); *Y10T 29/53691* (2015.01)

(58) Field of Classification Search
USPC ....... 29/605, 596, 240, 240.5, 732; 310/208, 310/195–203
See application file for complete search history.

(56) References Cited

U.S. PATENT DOCUMENTS

| | | | | |
|---|---|---|---|---|
| 6,429,568 B1* | 8/2002 | Shen | ............... | H02K 1/12 29/596 |
| 6,741,005 B2* | 5/2004 | Vohlgemuth | ............ | H02K 1/16 29/596 |
| 6,856,064 B2* | 2/2005 | Masumoto | ........... | H02K 15/024 310/216.008 |
| 7,064,469 B2* | 6/2006 | Jack | ............... | H02K 21/24 310/216.113 |
| 7,103,964 B2* | 9/2006 | Vohlgemuth | ........... | B21D 28/22 242/431 |
| 7,378,774 B2* | 5/2008 | Torii | ............... | H02K 1/276 310/156.53 |
| 7,777,387 B2* | 8/2010 | Nagai | ............... | H02K 15/022 29/596 |
| 8,106,561 B2* | 1/2012 | Myojin | ............... | H02K 1/148 29/596 |
| 8,466,596 B2* | 6/2013 | Maki | ............... | H02K 1/148 310/216.009 |
| 2003/0127938 A1* | 7/2003 | Shen | ............... | H02K 15/026 310/216.043 |
| 2005/0067912 A1* | 3/2005 | Murakami | ............ | H02K 1/148 310/216.043 |
| 2008/0179985 A1* | 7/2008 | Miyaji | ............... | H02K 1/16 310/216.048 |
| 2008/0201936 A1* | 8/2008 | Hoshino | ............... | H02K 15/03 29/598 |

FOREIGN PATENT DOCUMENTS

| | | |
|---|---|---|
| CN | 100394672 | 6/2008 |
| JP | 02-023048 | 1/1990 |
| JP | 06-044353 | 6/1994 |
| JP | 07-079551 | 3/1995 |
| JP | 08-163835 | 6/1996 |
| JP | 2000-116037 | 4/2000 |
| JP | 2000-245081 | 9/2000 |
| JP | 2005-185014 | 7/2005 |
| JP | 2008-283736 | 11/2008 |
| JP | 2009-153266 | 7/2009 |
| TW | 411653 | 11/2000 |

OTHER PUBLICATIONS

Japanese Office Action dated Oct. 18, 2011, issued in Japanese Application No. 2011-522174.
Office Action dated Oct. 16, 2013 issued in corresponding Taiwanese Application No. 100103379 [With English Translation].
Office Action dated Jan. 21, 2015 issued in corresponding Chinese Application No. 201180065880.5.

* cited by examiner

MANUFACTURING METHOD FOR HELICAL CORE FOR ROTATING ELECTRICAL MACHINE AND MANUFACTURING DEVICE FOR HELICAL CORE FOR ROTATING ELECTRICAL MACHINE

TECHNICAL FIELD

The present invention relates to a manufacturing method of a helical core for a rotating electrical machine. Particularly, the present invention is suitably used in the manufacturing of a helically coiled core (helical core) that is used in a rotating electrical machine. This application is a national stage application of International Application No. PCT/JP2011/051732 filed Jan. 28, 2011.

BACKGROUND ART

A core of a stator (referred to as a stator core as necessary in descriptions below) of a rotating electrical machine of a generator, an electric motor, or the like is formed by laminating metal plates such as a magnetic steel sheet. The stator core includes a yoke that extends in a circumferential direction of the stator core, and a plurality of teeth that extend in a direction of a rotating shaft from an inner circumferential surface of the yoke. In order to manufacture the stator core, a core piece, which has the same shape as the shape (shape on the plate surface) when viewed from thickness directions of the yoke and the teeth, is punched from a metal plate, and the core pieces are laminated in the thickness direction.

In the stator core manufactured as described above, at the time of the manufacturing, since elastic deformation does not occur in a surface direction, the magnetic characteristics are excellent. However, the outer circumferential shape of the yoke is circular, and except in the portions where the teeth are formed, the more inward portion than the inner circumference of the yoke is opened. Accordingly, if the stator core is manufactured in this way, many unused portions occur in the metal plate that is used for punching. Therefore, the yield of the metal plate is decreased, and the material costs are increased.

Thus, a helical core is used as the stator core in a rotating electrical machine such as a generator for a vehicle. The helical core is formed by laminating belt-shaped metal plates that are formed in shapes corresponding to the yoke and the teeth while processing the metal plates into a helical shape by bending in the plate surface. For example, the helical core is suitably used in a core for a rotating electrical machine in which the diameter is 50 mm or more and 300 mm or less. In this case, for example, as the metal plate for the helical core, a belt-shaped metal plate, in which the plate thickness is 0.15 mm or more and 0.80 mm or less, is suitably used. However, if the bending process in the plate surface is performed on the belt-shaped metal plate, the outer circumferential side of the portion corresponding to the yoke of the belt-shaped metal plate extends more largely than the inner circumferential side, and there is a concern that the thickness of the outer circumferential side of the belt-shaped metal plate (yoke) may be thinner than the thickness of the inner circumferential side.

Thereby, in Patent Document 1, magnetic powder is filled in a gap that is generated at the outer circumferential side of the core due to the fact that the outer circumferential side of the portion corresponding to the yoke of the belt-shaped metal plate more largely extends than the inner circumferential side. In this way, magnetic characteristics and stiffness of the core can be recovered.

Moreover, in Patent Document 2, a belt-shaped metal plate that is formed in a shape corresponding to the yoke and the teeth is divided into a plurality of core pieces. The circumference (the outer circumference of the portion corresponding to the yoke) of each core piece is formed in an arc shape conforming to the shape of the yoke. Moreover, the core pieces adjacent to each other are connected to each other by a connection portion that is formed on the outer circumferential side of the side end of the core piece, and each of core pieces, which is connected to each other by the connection portion, linearly extends. If the plurality of core pieces are processed into a helical shape by the bending processing in the plate surface, the regions of the inner circumferential side rather than the connection portion in the side surfaces of the portions corresponding to the yokes of the core pieces adjacent to each other are joined, and the connection portion is deformed so as to be bent. Thereby, it is possible to prevent the outer circumferential side corresponding to the yoke of the belt-shaped metal plate from being thinner than the inner circumferential side.

Moreover, in Patent Document 3, a long belt-shaped silicon steel sheet is punched, teeth and notches are formed at a time so as to leave bridge portions, and a unit core element sheet is manufactured. Furthermore, after a laminated core is formed from the unit iron core element sheets, an insulating layer is formed on the laminated core. The material loss of the unit core element sheet is decreased by forming the notch on the unit core element sheet, and strength of the laminated core according to the formation of the notch is improved by forming the insulating layer on the laminated core.

CITATION LIST

Patent Documents

[Patent Document 1] Japanese Unexamined Patent Application, First Publication No. 2005-185014
[Patent Document 2] Japanese Unexamined Patent Application, First Publication No. 2009-153266
[Patent Document 3] Japanese Unexamined Patent Application, First Publication No. 2000-116037

SUMMARY OF INVENTION

Technical Problem

However, in the technology disclosed in Patent Document 1, since the step for filling the magnetic powder is needed, it is difficult to sufficiently decrease the cost of the helical core for a rotating electrical machine.

Moreover, in the technology disclosed in Patent Document 2, the outer circumference of each core piece is an arc shape, and the metal plate between core pieces except for the portion corresponding to the connection portion is wasted. Accordingly, the portion, which is not used as the stator core in the metal plate used for the punching, is not sufficiently decreased. That is, in the technology disclosed in Patent Document 2, even though the helical core is used as the stator core, yield of the metal plate is not sufficiently decreased. Moreover, the belt-shaped metal plate disclosed in Patent Document 2 has a complicated shape. As described above, also in the technology disclosed in Patent Document 2, it is difficult to sufficiently decrease the cost of the helical core for a rotating electrical machine.

Furthermore, in the technology disclosed in Patent Document 3, since the teeth and notches are simultaneously punched, the strength of the unit core element plate is decreased from the step in which the silicon steel sheet is punched, to the step in which the laminated core is formed, and there is a concern that the unit core element sheet may be deformed (bent) while the unit core element sheet passes. In this case, the shape of the laminated core is deteriorated, and magnetic characteristics of the laminated core are decreased.

The present invention is made in consideration of the above-described problems, and an object thereof is to further decrease the cost of the helical core for a rotating electrical machine compared with the related art.

Solution to Problem (1) According to an aspect of the present invention, there is provided a manufacturing method of a helical core for a rotating electrical machine, including: a first process of forming a yoke portion extending along one direction and a plurality of tooth portions protruding toward a width direction of the yoke portion from a first side edge of the width direction, with respect to a belt-shaped metal plate extending along the one direction; a second process of forming a notch at a position between tooth portions of the yoke portion after the first process; and a third process of processing the belt-shaped metal plate into a helical shape by applying bending to the metal plate so that the belt-shaped metal plate is curved toward the width direction sequentially from a portion in which the notch is formed after the second process, and in the third process, a distance between a position at which the application of the bending starts and the position at which the notch is formed is limited to within a predetermined dimension.

(2) The manufacturing method of the helical core for a rotating electrical machine described in (1) may further include a process of heating the belt-shaped metal plate before the third process and after the second process.

(3) The manufacturing method of the helical core for a rotating electrical machine described in (1) or (2) may further include a process of performing stress relief annealing by heating the belt-shaped metal plate during or after the third process.

(4) In the manufacturing method of the helical core for a rotating electrical machine described in (1) or (2), a depth dimension of the notch may be 1/2 times or more of a width dimension of the yoke portion and be less than the width dimension of the yoke portion.

(5) In the manufacturing method of the helical core for a rotating electrical machine described in (1) or (2), a shape on a plate surface of the notch may be an isosceles triangle or an equilateral triangle that includes a base on a first side edge in the width direction of the yoke portion.

(6) In the manufacturing method of the helical core for a rotating electrical machine described in (1) or (2), a shape on a plate surface of the notch may be a shape in which a circle or an ellipse is added to a vertical angle of an isosceles triangle or an equilateral triangle that includes a base on the first side edge in the width direction of the yoke portion.

(7) In the manufacturing method of the helical core for a rotating electrical machine described in (1) or (2), at least a portion of a second side edge in the width direction of the yoke portion may be linear.

(8) In the manufacturing method of the helical core for a rotating electrical machine described in (1) or (2), the predetermined dimension may be 10 mm or more and 1000 mm or less.

(9) According to another aspect of the present invention, there is provided a manufacturing apparatus of a helical core for a rotating electrical machine, including: a first processing unit that forms a yoke portion extending along one direction and a plurality of tooth portions protruding toward a width direction of the yoke portion from a first side edge of the width direction, with respect to a belt-shaped metal plate extending along the one direction; a second processing unit that forms a notch at a position between tooth portions of the yoke portion; and a helical processing unit that processes the belt-shaped metal plate into a helical shape by applying bending to the metal plate so that the belt-shaped metal plate is curved toward the width direction sequentially from a portion in which the notch is formed, wherein the distance between a position at which the application of the bending starts in the helical processing unit and the position at which the notch is formed in the second processing unit is within a predetermined dimension.

(10) The manufacturing apparatus of the core for a rotating electrical machine described in (9) may further include a heating unit that heats the belt-shaped metal plate between the second processing unit and the helical processing unit.

(11) The manufacturing apparatus of the helical core for a rotating electrical machine described in (9) or (10) may further include a stress relief heating unit that performs stress relief annealing by heating the belt-shaped metal plate during or after the belt-shaped metal plate is processed into a helical shape by the helical processing unit.

(12) The manufacturing apparatus of the helical core for a rotating electrical machine described in (9) or (10) may further include a guide that supports the belt-shaped metal plate from a lower side in at least a vertical direction between the first processing unit and the helical processing unit.

(13) In the manufacturing apparatus of the helical core for a rotating electrical machine described in (9) or (10), the predetermined dimension may be 10 mm or more and 1000 mm or less.

Advantageous Effects of Invention

According to the present invention, the notch portion, in addition to the yoke portion and the tooth portion, is formed on the belt-shaped steel sheet (belt-shaped metal plate) that forms the helical core for a rotating electrical machine. The notch portion is formed at the position between tooth portions of the yoke portion. By forming the notch portion on the belt-shaped steel sheet, when the helical core for a rotating electrical machine is formed, it is possible to prevent the thickness of the outer circumferential side of the yoke of helical core for a rotating electrical machine from being thinner than the thickness of the inner circumferential side. Moreover, when the belt-shaped steel sheet is processed into a helical shape, stress can be more concentrated in the outer circumferential side region of the yoke portion than in the notch portion. Accordingly, unlike the related art, it is not necessary to perform a specific treatment after processing the belt-shaped steel sheet into a helical shape, or to process the shape of the belt-shaped steel sheet processed into a helical shape in a complicated shape. Furthermore, a helical core for a rotating electrical machine having improved characteristics can be obtained, and costs of the helical core for a rotating electrical machine can be decreased.

When the helical core for a rotating electrical machine is manufactured, the yoke portion and the tooth portion, and the notch portion are separately formed on the belt-shaped steel sheet, and the belt-shaped steel sheet is processed into a helical shape at the position within the predetermined dimension after the notch portion is formed on the belt-shaped steel sheet. Thus, bending of the belt-shaped steel sheet after the notch is formed can be suppressed if possible, and the belt-shaped steel strip having various sheet numbers (from one sheet to the plurality of sheets) can be flexibly prepared from one belt-shaped steel sheet. Accordingly, magnetic characteristics, yield, and production flexibility of the helical core for a rotating electrical machine are increased, and costs of the helical core for a rotating electrical machine can be further decreased.

DESCRIPTION OF EMBODIMENTS

Figure 1:
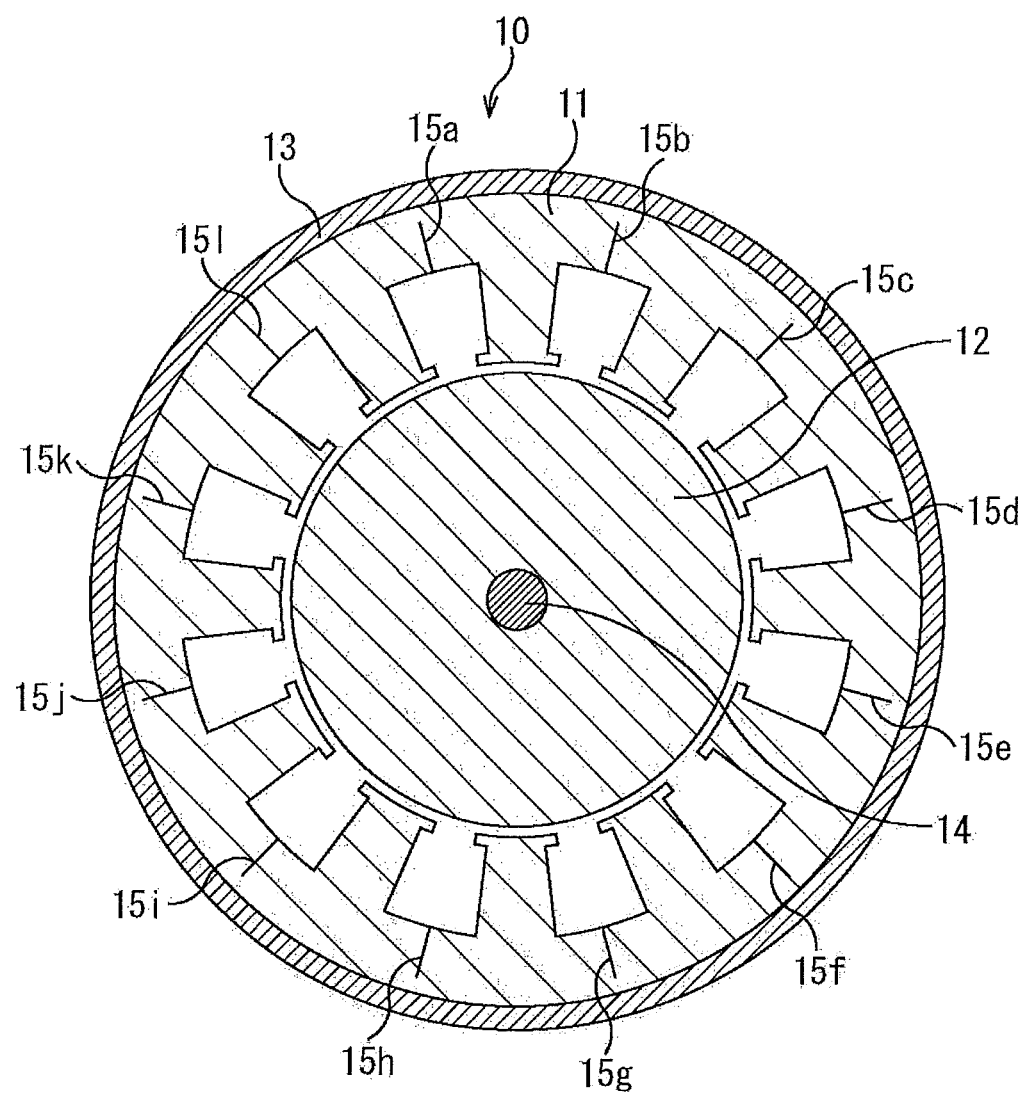
FIG. 1 is a schematic view showing an example of a configuration of a rotating electrical machine according to an embodiment of the present invention.

Hereinafter, an embodiment of the present invention will be described referring to the drawings.

First, an example of a helical core will be described, which is manufactured by a manufacturing method of a helical core for a rotating electrical machine according to the present embodiment.

FIG. 1 is a schematic view showing an example of a configuration of a rotating electrical machine which is an application example of the helical core for a rotating electrical machine. Specifically, FIG. 1 is a cross-sectional view when the rotating electrical machine is cut from a direction perpendicular to the rotating shaft.

In FIG. 1, the rotating electrical machine 10 includes a stator (stationary portion) 11, a rotor (rotator) 12, a case 13, and a rotating shaft 14. Moreover, in FIG. 1, for convenience of the illustration, members such as a coil are omitted.

The stator 11 has a stator core that includes a yoke that extends in a circumferential direction of the rotating electrical machine, and teeth that extend from an inner circumferential side end (end surface) of the yoke in the direction of the rotating shaft 14. Moreover, a coil (not shown) is inserted so as to be coiled around the teeth in a slot which is a region between teeth adjacent to each other in the circumferential direction of the rotating electrical machine. The stator core is a helical core. Moreover, FIG. 1 exemplifies a case where the number of teeth is 12. However, the number of the teeth is not limited to the example shown in FIG. 1.

As shown in FIG. 1, in the present embodiment, cut lines 15a to 15l (15) are formed from the inner circumferential surface of the stator 11 toward the outer circumferential surface in a middle position in the circumferential direction of each slot. The surfaces of cut lines 15a to 15l opposite to each other are joined to each other, and gaps almost do not exist in the cut line 15a to 15l. In the present embodiment, stress is more concentrated at the outer circumferential side region of the stator 11 than at the cut lines 15a to 15l. Thereby, the stress generated in the cut lines 15a to 15l is preferably small if possible within a range which is smaller than the stress generated in the outer circumferential side region of the stator 11, and is most preferably 0.

Moreover, when the stator 11 is formed by a method described below, the (radial directional) length of the cut line 15 (15a to 15l) is preferably long if possible within a range in which the shape of the stator 11 does not get damaged. The outer circumferential side region of the stator 11 is smaller than the cut line 15 (that is, the cut line 15 is long if possible), if possible, and thus, the region is prevented from being included in a magnetic path.

Specifically, the length of the cut line 15 is at least 1/2 times or more of the length in the radial direction of the yoke. The length of the cut line 15 is preferably 3/4 times or more of the length in the radial direction of the yoke, and is more preferably 4/5 times or more of the length in the radial direction of the yoke. However, the length of the cut line 15 is less than the length in the radial direction of the yoke.

The rotor 12 is disposed in a position at which the outer circumferential surface of the rotor is opposite with a predetermined interval to the tip surfaces (that is, the inner circumferential surface of the stator 11) of the teeth of the stator 11. Furthermore, the shaft center (rotating shaft 14) of the rotor 12 approximately coincides with the shaft center (the center of gravity) of the stator 11. Moreover, in the present embodiment, in order to explain the stator 11 as an example of the characterized portion of the helical core, in FIG. 1, the configuration of the rotor 12 is shown to be simplified.

An assembly processing such as shrinkage fitting is performed to the case 13, and thus, the case 13 closely contacts the stator 11 from the circumference (outer circumference) of the stator 11 and the stator 11 may be fixed, and the stator 11 may be fixed to the case 13 by welding or bolting. For example, the case 13 is configured of soft iron or stainless steel.

Figure 2A:
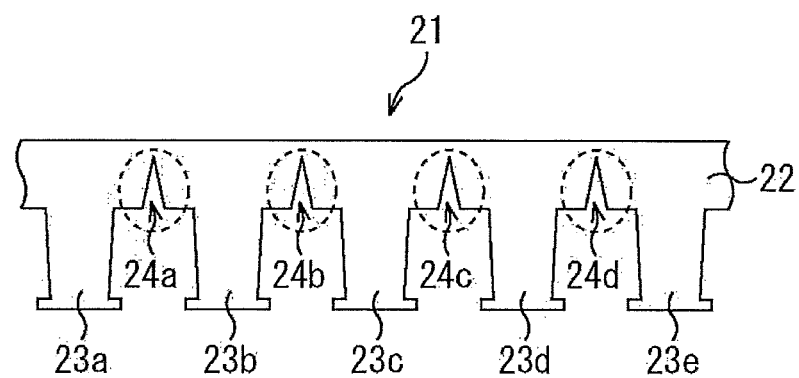
FIG. 2A is a schematic view showing an example of a belt-shaped steel sheet before the sheet is processed into a helical shape in a manufacturing method of a helical core for a rotating electrical machine according to an embodiment of the present invention.
Figure 2B:
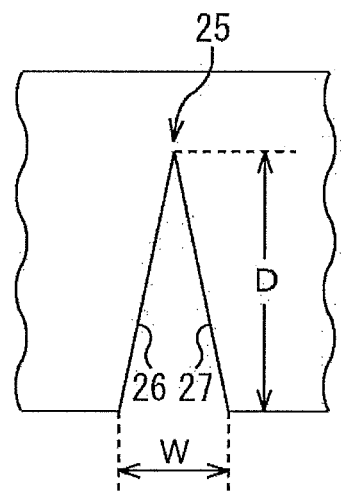
FIG. 2B is an enlarged view in the vicinity of a broken line portion shown in FIG. 2A.

FIGS. 2A and 2B are schematic views showing an example of a belt-shaped steel sheet before the sheet is processed into a helical shape. Specifically, FIG. 2A is a view when the belt-shaped steel sheet is viewed from a direction perpendicular to the plate surface. Moreover, FIG. 2B is an enlarged view of a region surrounded by a broken line in FIG. 2A. Moreover, the steel sheet (belt-shaped steel sheet) is an example of a metal plate (belt-shaped metal plate), and specifically, the metal plate includes a magnetic steel sheet, a cold rolled steel sheet, and a hot rolled steel sheet.

As shown in FIG. 2A, a yoke portion 22 corresponding to the yoke of the stator 11, tooth portions 23a to 23e (23) corresponding to the teeth of stator 11, and notch portions 24a to 24b (24) are formed on a belt-shaped steel sheet 21 that extends along one direction. Moreover, in FIG. 2A, only five tooth portions 23 are shown. However, the tooth portions 23 having the same number as that of the teeth of the stator 11 are formed on the belt-shaped steel sheet 21. Moreover, in FIG. 2A, only four notch portions 24 are shown. However, the notch portions 24 having the same number as that of the cut lines 15a to 15l are formed on the belt-shaped steel sheet 21.

Furthermore, a width direction of the yoke portion 22 and a longitudinal direction (extension direction) of the tooth portion 23 coincide with each other, and a longitudinal direction of the yoke portion 23 and a width direction (a direction perpendicular to the longitudinal direction of the tooth portion 23) of the tooth portion 23 coincide with each other.

As shown in FIG. 2A, the tooth portions 23 are formed at equal intervals along the longitudinal direction (extension direction) of the belt-shaped steel sheet 21 so that the tooth portions protrude from a first side edge (end) in the width direction of the yoke portion 22 toward the width direction.

The notch portion 24 (notch) is formed at position between tooth portions 23 of the yoke portion 22. In the present embodiment, since a helical core is used as the stator core, the notch portion 24 is formed in a position that is positioned at an end (one end in the width direction of the yoke portion 22 and an end of a side in which the tooth portion 23 is formed on the yoke portion 22) of the inner side of the yoke portion 22 and is positioned at the middle (the middle of tooth portions 23 adjacent to each other) in the longitudinal direction of an end of the yoke portion 22 corresponding to a bottom of each slot. Moreover, the notch portions 24 are formed one by one over all region (the end of the yoke portion 22 corresponding to bottoms of the slots) corresponding to the slots.

Furthermore, an end (other end in the width direction of the yoke portion 22 and an end of a side of in which the tooth portion 23 is not formed on the yoke portion 22) of the outer side of the yoke portion 22 of the belt-shaped steel sheet 21 is linear. Since the end of the outer side of the yoke portion 22 of the belt-shaped steel sheet 21 is linear, when the belt-shaped steel sheet 21 is processed into a helical shape, nonuniform deformation and unexpected distortion are prevented, and shape accuracy of the belt-shaped steel sheet 21 can be increased. Thereby, it is preferable that at least a portion of the end of the outer side of the yoke portion 22 of the belt-shaped steel sheet 21 be linear. Moreover, for example, an attachment groove to the case 13 may be provided on the end of the outer side of the yoke portion 22 of the belt-shaped steel sheet 21.

The shape of the notch portion 24 on the plate surface is an isosceles triangle or an equilateral triangle having a base on the end (one end in the width direction) of the inner side (tooth portion 23 side) of the yoke portion 22. The width W (width dimension) of the notch portion 24 in the end of the inner side of the yoke portion 22 is a value corresponding to (proportional to) a difference between the length of the outer circumference and the length of the inner circumference of the stator 11. Moreover, it is preferable that the length (depth dimension) D of the notch portion 24 be long if possible within a range in which the shape of the stator 11 does not get damaged when the stator 11 is formed according to a method as described below. As described above, in this case, a region 25 (refer to FIG. 2B), in which stress generated by processing the belt-shaped steel sheet 21 into a helical shape is concentrated, can be decreased if possible. Specifically, since the length D of the notch portion 24 corresponds to the length of the cut line 15, the length D (depth dimension) of the notch portion 24 is at least 1/2 times or more of the length in the width direction of the yoke portion 22 (width dimension and the length between the end of the inner side (tooth portion 23 side) of the yoke portion 22 and the end of the outer side). The length D of the notch portion 24 is preferably 3/4 times or more of the length in the width direction of the yoke portion 22, and is more preferably 4/5 times or more of the length in the width direction of the yoke portion 22. However, the length D of the notch portion 24 is less than the length in the width direction of the yoke portion 22.

The belt-shape steel sheet 21 is configured as described above, and thus, the difference between the length the outer circumference and the length of the inner circumference of the stator 11 can be corrected by the notch portion 24, and oblique lines 26 and 27 (refer to FIG. 2B) of the notch portion 24 opposite to each other can be aligned with each other when the belt-shaped steel sheet 21 is processed into a helical shape according to a method described below.

Furthermore, if the oblique lines of the notch portion opposite to each other can be aligned with each other when the belt-shaped steel sheet is processed into a helical shape, a shape of a notch portion may be different from the above-mentioned shape of the notch portion 24. Hereinafter, an example of a notch portion having the shape different from that of the notch portion 24 will be described. Moreover, it is assumed that configurations other than the notch portion are the same as the configurations of the above descriptions, the same reference numerals as the reference numerals attached in FIG. 1 are attached to the same portions as the configurations of the above descriptions, or the like, and the detailed descriptions thereof are omitted here.

Figure 5:
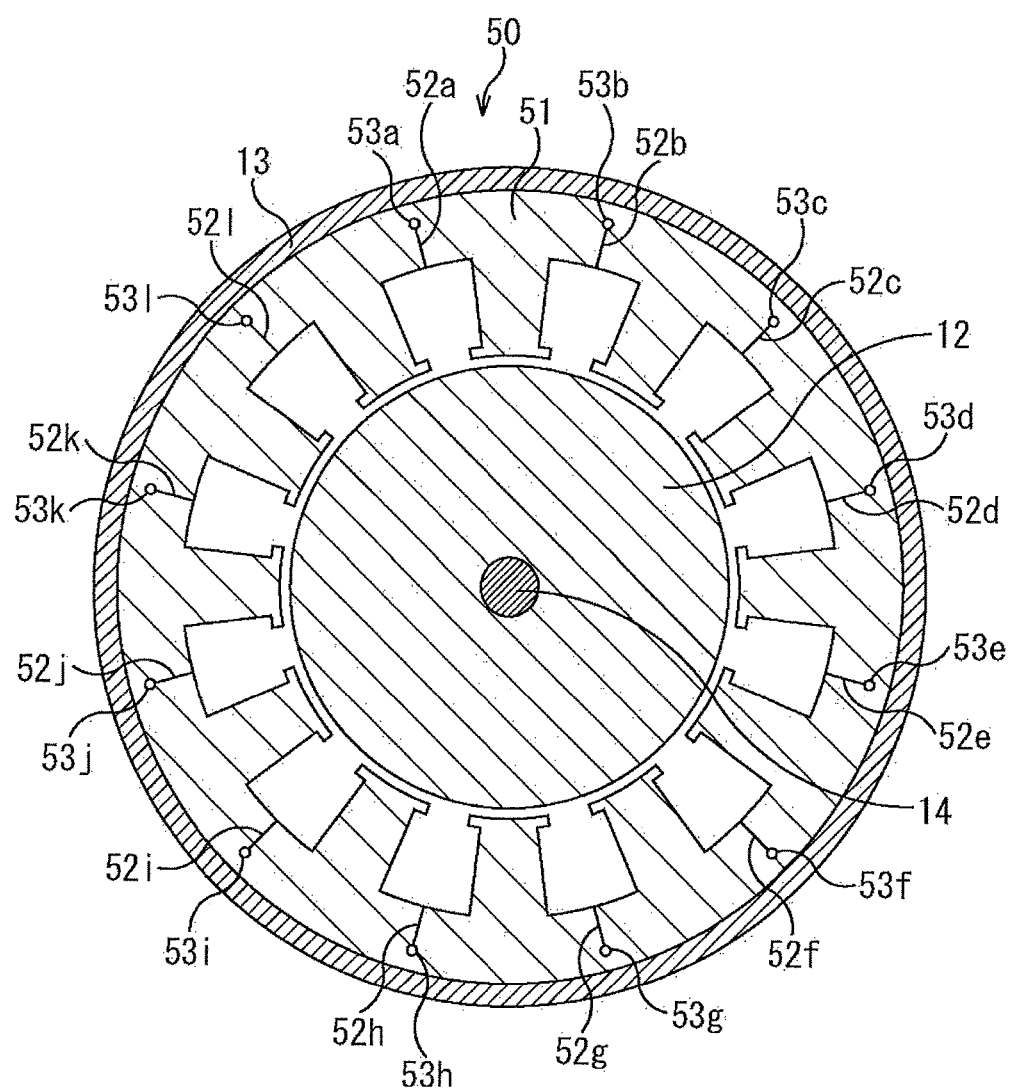
FIG. 5 is a schematic view showing an example of a configuration of a rotating electrical machine according to an embodiment of the present invention.

FIG. 5 is a schematic view showing an example of a configuration of a rotating electrical machine which is an application example of the helical core for the rotating electrical machine. FIG. 5 corresponds to FIG. 1.

In FIG. 5, a rotating electrical machine 50 includes a stator 51, the rotor 12, the case 13, and the rotating shaft 14.

As shown in FIG. 5, in the present embodiment, cut lines 52a to 52l (52) are formed from the inner circumferential surface of the stator 51 toward the outer circumference in the middle position in the circumferential direction of each slot, and circular column shaped or elliptical column shaped holes 53a to 53l (53) are formed on the tips of the cut lines 52a to 52l (side close to the end of the outer circumferential side of the stator 51). Surfaces of cut lines 52a to 52l opposite to each other are joined to each other, the stress generated in the opposite surfaces (cut lines 52a to 52l) is preferably small, and if possible within a range which is smaller than the stress generated in the outer circumferential side region of the stator 51, and is most preferably 0. Moreover, when the stator 51 is formed by a method described below, the total value of the (radial directional) lengths of the cut line 52 and the hole 53 is preferably long if possible within a range in which the shape of the stator 51 does not get damaged.

Figure 6A:
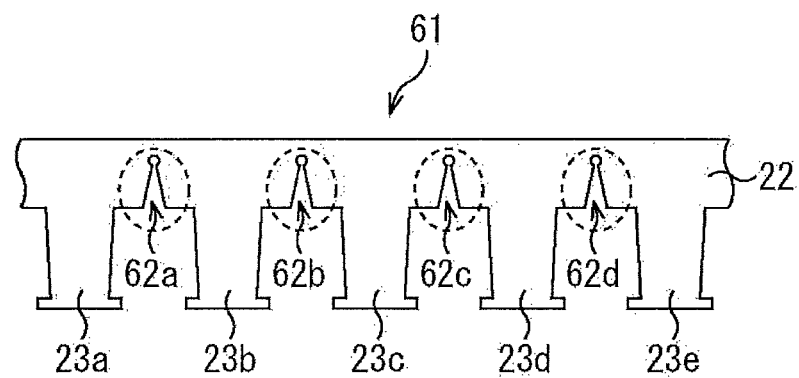
FIG. 6A is a schematic view showing an example of a belt-shaped steel sheet before the sheet is processed into a helical shape in a manufacturing method of a helical core for a rotating electrical machine according to an embodiment of the present invention.
Figure 6B:
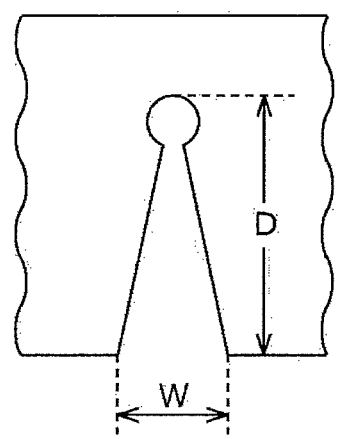
FIG. 6B is an enlarged view in the vicinity of a broken line portion shown in FIG. 6A.

FIGS. 6A and 6B are schematic views showing an example of a belt-shaped steel sheet before the sheet is processed into a helical shape. FIGS. 6A and 6B correspond to FIGS. 2A and 2B respectively.

As shown in FIG. 6A, the yoke portion 22, tooth portions 23a to 23e (23), and notch portions 62a to 62d (62) are formed on a belt-shaped steel sheet 61.

Since a helical core is used as the stator core, the notch portion 62 (notch) is formed in a position that is positioned at an end (one end in the width direction of the yoke portion 22 and an end of a side in which the tooth portion 23 is formed on the yoke portion 22) of the inner side of the yoke portion 22 and is positioned at the middle (the middle of tooth portions 23 adjacent to each other) in the longitudinal direction of an end of the yoke portion 22 corresponding to a bottom of each slot. Moreover, the notch portions 62 are formed one by one over all region (the end of the yoke portion 22 corresponding to bottoms of the slots) corresponding to the slots.

The shape of the notch portion 62 on the plate surface is a shape in which a circle or an ellipse is added to a vertical angle of an isosceles triangle or an equilateral triangle having a base on the end (one end in the width direction) of the inner side (tooth portion 23 side) of the yoke portion 22. That is, in the notch portion 62, the circle or the ellipse is disposed so as to include the vertical angle of the isosceles triangle or the equilateral triangle. The width W of the notch portion 62 in the end of the inner side of the yoke portion 22 is a value corresponding to (proportional to) a difference between the length of the outer circumference and the length of the inner circumference of the stator 51. Moreover, it is preferable that the length (depth dimension) D of the notch portion 62 be long if possible within a range in which the shape of the stator 51 does not get damaged when the stator 51 is formed according to a method as described below.

Also when the above-described notch portion 62 is formed on the yoke portion 22, effects similar to those when the notch portion 24 is formed on the yoke portion 22 can be obtained.

The shapes of the plate surfaces of the belt-shaped steel sheet 21 shown in FIG. 2A and the belt-shaped steel sheet 61 shown in FIG. 6A described above are obtained by a processing method (cutting processing) such as slitter cutting processing by a roll blade, punching, or processing by laser. Hereinafter, for simplification of explanation, a case where the helical core for a rotating electrical machine is manufactured from the belt-shaped steel sheet 21 shown in FIG. 2A will be described.

First, a manufacturing method of the helical core for a rotating electrical machine and a basic configuration of a manufacturing apparatus thereof will be described.

Figure 3:
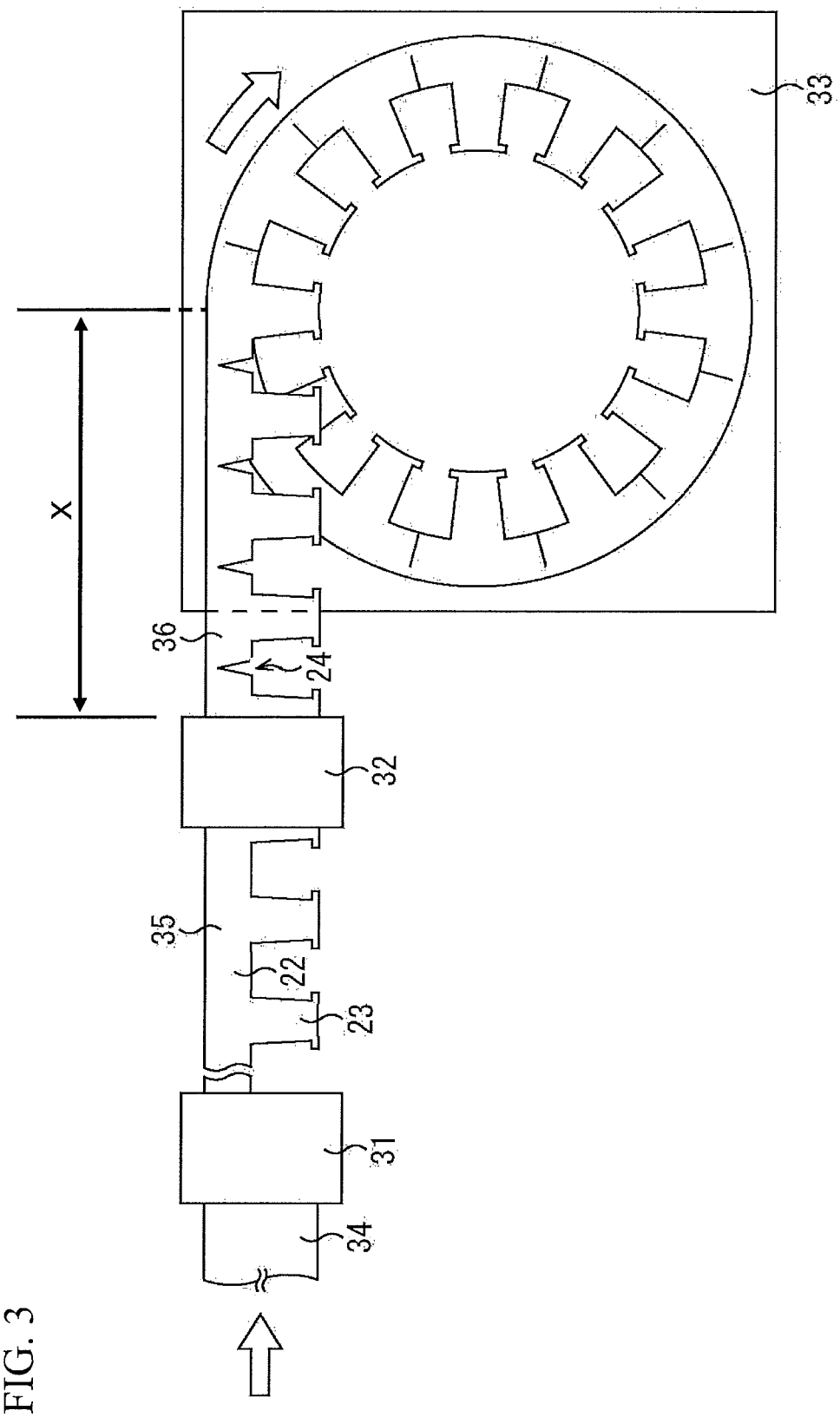
FIG. 3 is a schematic view showing an example of a configuration of a manufacturing apparatus of a helical core for a rotating electrical machine according to an embodiment of the present invention.

FIG. 3 is a schematic view showing an example of a configuration of the manufacturing apparatus of the helical core for a rotating electrical machine (stator 11). Moreover, a void arrow shown in FIG. 3 indicates a direction in which the belt-shaped steel sheet moves.

In FIG. 3, the manufacturing apparatus of the helical core for a rotating electrical machine includes a shape processing unit 31 (first processing unit), a notch processing unit 32 (second processing unit), and a helical processing unit 33.

The shape processing unit 31 performs processing such as slitter cutting processing by a roll blade with respect to the rectangular belt-shaped steel sheet 34, and forms the yoke portion 22 and the tooth portion 23 shown in FIG. 2A. In this step, the notch portion 24 is not formed.

The notch processing unit 32 performs processing such as punching with respect to the belt-shaped steel sheet 35 on which the yoke portion 22 and the tooth portion 23 are formed, and sequentially forms the notch portion 24 shown in FIG. 2A by a predetermined number (one or two or more). The notch processing unit 32 (a position at which the notch portion 24 is formed) is disposed at a position which does not interfere with the helical processing unit 33 and a position within a predetermined distance (predetermined dimension) from the position at which the belt-shaped steel sheet 36 is processed into a helical shape. If the distance from the position at which the notch portion 24 is formed on the belt-shaped steel sheet 35 to the position at which the belt-shaped steel sheet 36 is processed into a helical shape is long, there is a concern that the belt-shaped steel sheet 36 may be bent due to existence of the notch portion 24 before the sheet is processed into a helical shape. Particularly, the longer the length D of the notch portion 24, the higher the possibility that the belt-shaped steel sheet 36 may be bent. In this way, if the belt-shaped steel sheet 36 is bent, the belt-shaped steel sheet 36 is deformed, the oblique lines of the notch portion opposite to each other cannot be aligned to each other when the steel sheet is processed into a helical shape, and thus, a gap occurs in the cut line 15 of the helical core.

In this case, magnetic characteristics of the belt-shaped steel sheet 36 itself may be decreased or magnetic characteristics of the helical core may be decreased. Moreover, since the belt-shaped steel sheet 36 is processed into a helical shape in a state where the steel sheet is bent in the lamination direction, a gap occurs in the lamination direction of the belt-shaped steel sheet 36, and thus, the shape of the helical core is deteriorated. Furthermore, when the shape of the helical core is forcibly corrected, since large processing distortion is introduced to the helical core, magnetic characteristics of the helical core are largely decreased. Accordingly, in order to suppress the decrease of the magnetic characteristics due to the bending, it is preferable that a distance (the predetermined dimension) x between a coiling position (a position at which the being processing starts) of the helical processing and the end surface of the side close to the coiling position in the notch processing unit 32 which forms the notch portion 24 be 1000 mm or less. In order to further improve the magnetic characteristics of the helical core, the distance x is more preferably 500 mm or less, and is most preferably 300 mm or less. Moreover, the distance x may be appropriately set according to the strength and the thickness of the belt-shaped steel sheet, and the depth dimension of the notch portion. For example, when the length D of the notch portion 24 is 3/4 times or more of the length in the width direction of the yoke portion 22, the distance x may be set to 500 mm or less. Moreover, the distance x may be set to 10 mm or more so that the notch processing unit 32 and the helical processing unit 33 (or the belt-shaped steel sheet 36 which is subjected to the helical processing) do not interfere with each other.

The helical processing unit 33 laminates the belt-shaped steel sheet 36 while processing the steel sheet into a helical shape by applying bending to the steel sheet so as to sequentially bend the belt-shaped steel sheet 36 toward the plate width direction (the direction perpendicular to the plate-passing direction and the plate thickness direction) from the portion in which the notch portion 24 is formed by the notch processing unit 32. Specifically, the helical processing unit 33 may process the belt-shaped steel sheet 36 into a helical shape by a nonuniform pressure roll or may forcibly process the belt-shaped steel sheet 36 into a helical shape by making the steel sheet be along a guide so that the length in the longitudinal direction (circumferential direction) of the yoke portion 22 is longer than the length in the width direction (circumferential direction) of the tooth portion 23. In this way, the yoke portion 22 is disposed on the outer circumferential side of the stator 11, and the tooth portion 23 is disposed on the inner circumferential side of the stator 11. Moreover, the belt-shaped steel sheet 36 that is processed and laminated by the helical processing unit 33 moves downwardly in the vertical direction while being coiled around a core bar (not shown) of the helical processing unit. Thereby, the belt-shaped steel sheet 34 can be passed without changing the passing height of the belt-shaped steel sheet 34.

For example, the belt-shaped steel sheet 36, which is processed into a helical shape, is connected at a predetermined portion (for example, lamination direction) by a connecting method such as caulking, bonding, or welding. The connection of the belt-shaped steel sheet 36 processed into a helical shape ends in this way, and the stator 11 is formed by performing a predetermined treatment if necessary.

Figure 4A:
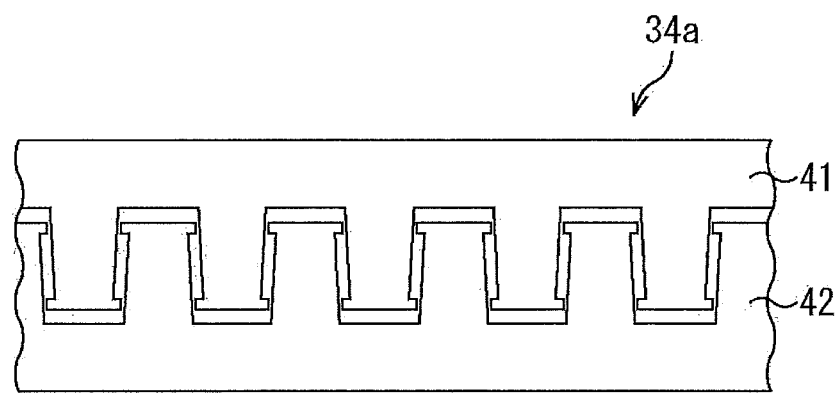
FIG. 4A is a schematic view showing an example of an aspect (cutting position) that forms a yoke portion and a tooth portion on a rectangular belt-shaped steel sheet in a manufacturing method of a helical core for a rotating electrical machine according to an embodiment of the present invention.

Furthermore, as described above, in the present embodiment, the notch portion 24 is formed on the belt-shaped steel sheet 35 at the position immediately before the belt-shaped steel sheet 36 is processed into a helical shape after the yoke portion 22 and the tooth portion 23 are formed on the belt-shaped steel sheet 34. For example, if the notch portion 24 along with the yoke portion 22 and the tooth portion 23 are formed on the belt-shaped steel sheet at a time, since stiffness of the belt-shaped steel sheet is decreased, the belt-shaped steel sheet is deformed before the belt-shaped steel sheet reaches the helical processing unit 33, and the magnetic characteristics and the shape of the helical core are deteriorated. Moreover, since the notch portion 24 along with the yoke portion 22 and the tooth portion 23 are simultaneously formed, it is difficult to reuse a processing unit (for example, a die or CAD data) due to the change of dimension such as the length D of the notch portion 24, and thus, there is a concern that the costs may be increased. Moreover, even when the position at which the yoke portion 22, the tooth portion 23, and the notch portion 24 are formed at a time is immediately before the position in which the belt-shaped steel sheet is processed into a helical shape, since it is difficult to manufacture a plurality of belt-shaped steel sheets 41 and 42 from one rectangular belt-shaped steel sheet 34a as shown in FIG. 4A, production flexibility of the helical core is decreased.

Furthermore, in the manufacturing method and the manufacturing apparatus of the helical core for a rotating electrical machine of the present embodiment, the following configurations may be provided as modifications of the present embodiment in addition to the above-described basic configuration.

The manufacturing apparatus of the helical core for a rotating electrical machine may include a guide that suppresses deformation of the belt-shaped steel sheets 35 and 36. For example, the guide (for example, a guide 37 shown in FIG. 8) is disposed between the shape processing unit 31 and the helical processing unit 33 so as to support the belt-shaped steel sheets 35 and 36 at least from the lower side in the vertical direction. Furthermore, the guide may support the belt-shaped steel sheets 35 and 36 from the upper side and the lower side in the vertical direction.

Figure 8:
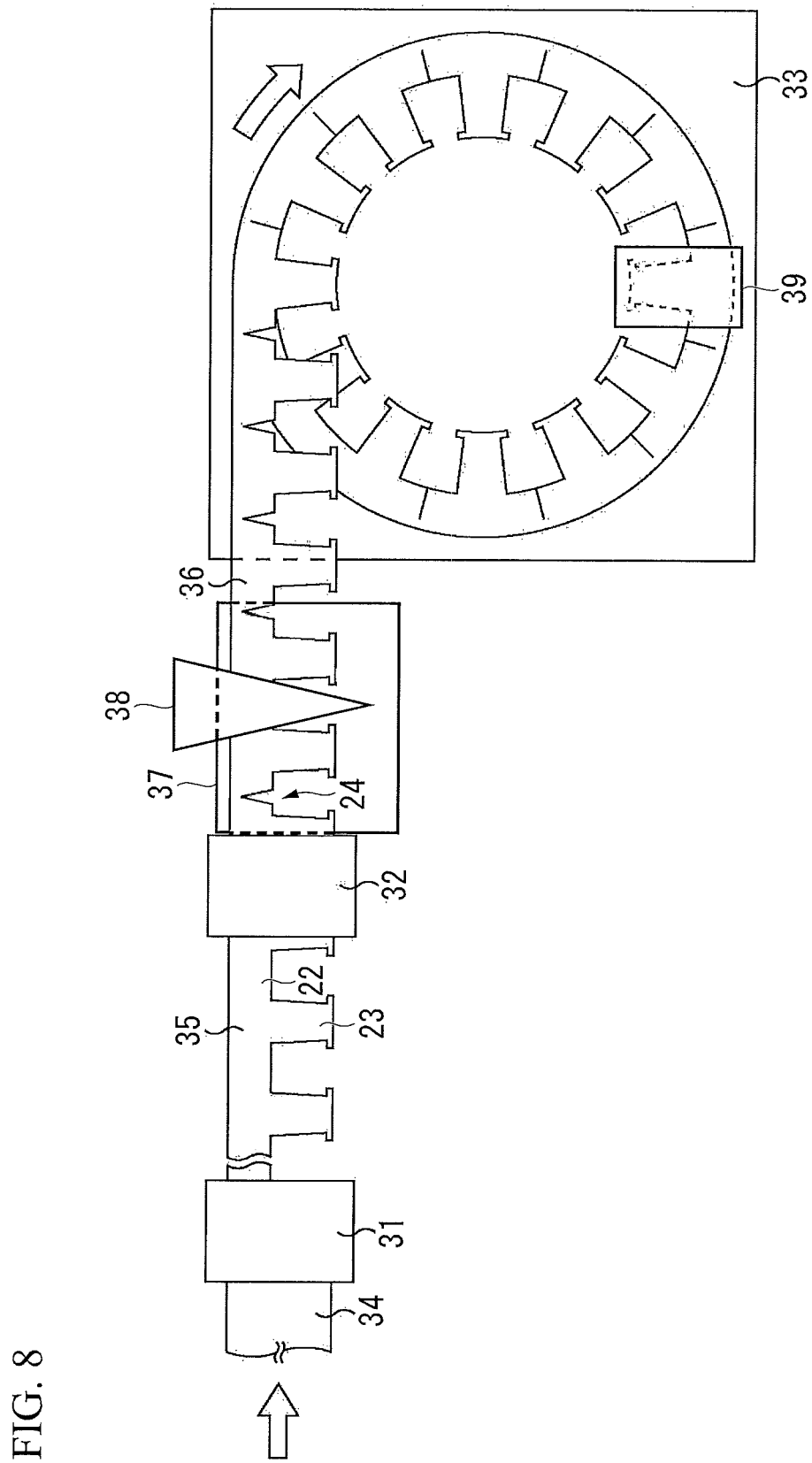
FIG. 8 is a schematic view showing an example of a configuration of a manufacturing apparatus of a helical core for a rotating electrical machine according to a modification of the embodiment.

Moreover, when a hard steel sheet (particularly, 3% Si-based magnetic steel sheet) such as a magnetic steel sheet is processed into a helical shape, as shown in FIG. 8, a heating unit 38 that heats the belt-shaped steel sheet 36 is disposed between the notch processing unit 32 and the helical processing unit 33, and the belt-shaped steel sheet 36 may be heated after the notch processing. In this way, the belt-shaped steel sheet 36 is heated at the position immediately before the belt-shaped steel sheet 36 is processed into a helical shape, and thus, the processability of the belt-shaped steel sheet 36 is improved temporarily, and the belt-shaped steel sheet 36 can be effectively processed into a helical shape certainly. The heating temperature of the heating unit 38 may be determined according to the steel sheet. For example, the heating temperature is approximately 300° C. in 3% Si-based magnetic steel sheet.

Moreover, according to above-described process, distortion (for example, punching distortion or bending distortion) occurs in the helical core. Since the distortion decreases the magnetic characteristics of the helical core, it is preferable that the distortion be removed by performing the heating. For example, as shown in FIG. 8, stress relief annealing (SRA) may be performed to the belt-shaped steel sheet 36 in an on-line using a stress relief heating unit 39 such as an induction heating furnace while coiling the belt-shaped steel sheet 36 around the core bar (not shown) of the helical processing unit 33 immediately after the belt-shaped steel sheet 36 is processed by the helical processing unit 33. Moreover, for example, stress relief annealing may be performed to a core, in which the helical processing ends, at a separate line using an external heating unit such as an induction heating furnace or a box type furnace. In this case, the distortion, which is generated due to connection methods such as caulking, bonding, or welding, can be also removed. It is preferable that the above-described stress relief annealing be appropriately performed according to the characteristics required in the helical core and the kind of the belt-shaped steel sheet 36. For example, the annealing temperature of the stress relief annealing is approximately 750° C.

Furthermore, the notch processing unit may be installed so as to move or rotate in the width direction of the passing belt-shaped steel sheet. In this case, the depth dimension of the notch portion and the position of the notch portion can be flexibly adjusted without changing the processing unit.

Figure 4B:
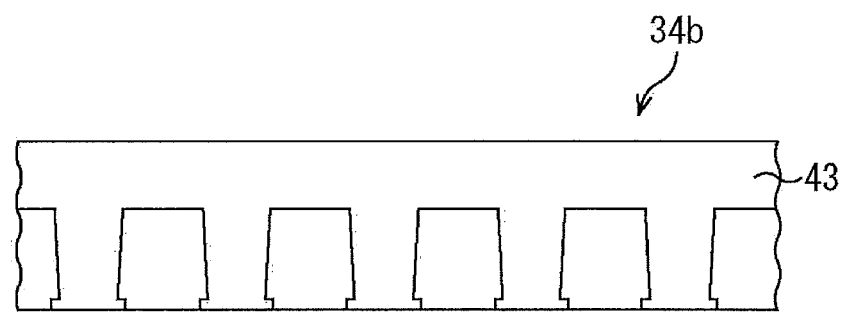
FIG. 4B is a schematic view showing an example of the aspect (cutting position) that forms the yoke portion and the tooth portion on the rectangular belt-shaped steel sheet in the manufacturing method of the helical core for a rotating electrical machine according to the embodiment of the present invention.

FIGS. 4A and 4B are schematic views showing an example of an aspect (cutting position) that forms the yoke portion 22 and a tooth portion 23 on the rectangular belt-shaped steel sheet 34.

In FIG. 4A, the rectangular belt-shaped steel sheet 34*a* is processed so that the tip side of the tooth portion 23 of one belt-shaped steel sheet 41 (42) is disposed in a region corresponding to the slot of the other belt-shaped steel sheet 42 (41) (that is, the tooth portion 23 of one belt-shaped steel sheet 41 (42) and the tooth portion 23 of the other belt-shaped steel sheet 42 (41) are alternately disposed to each other). In this case, unnecessary portions of the belt-shaped steel sheet 34 can be decreased if possible, and a decrease in yield of the belt-shaped steel sheet 34*a* can be prevented if possible. In this case, for example, the shape of the one belt-shaped steel sheet 41 (42) and the shape of the other belt-shaped steel sheet 42 (41) may be different from each other. For example, dimensions such as the length in the longitudinal direction of the tooth portion 23 or the width of the yoke portion 22 may be appropriately changed.

Moreover, it is not necessary to form the plurality of belt-shaped steel sheets 41 and 42 from the one rectangular belt-shaped steel sheet 34*a* as shown in FIG. 4A. That is, as shown in FIG. 4B, one belt-shaped steel sheet 43 may be formed from the single rectangular belt-shaped steel sheet 34*b*. In this case, since the end (one end) of the outer side of the yoke portion 22 is linear, even though the belt-shaped steel sheet 43 is formed as shown in FIG. 4B, unnecessary portions of the rectangular belt-shaped steel sheet 34*b* in the region of the outer side (the one end side) than the yoke portion 22 can be reduced as compared to the related art.

Figure 7A:
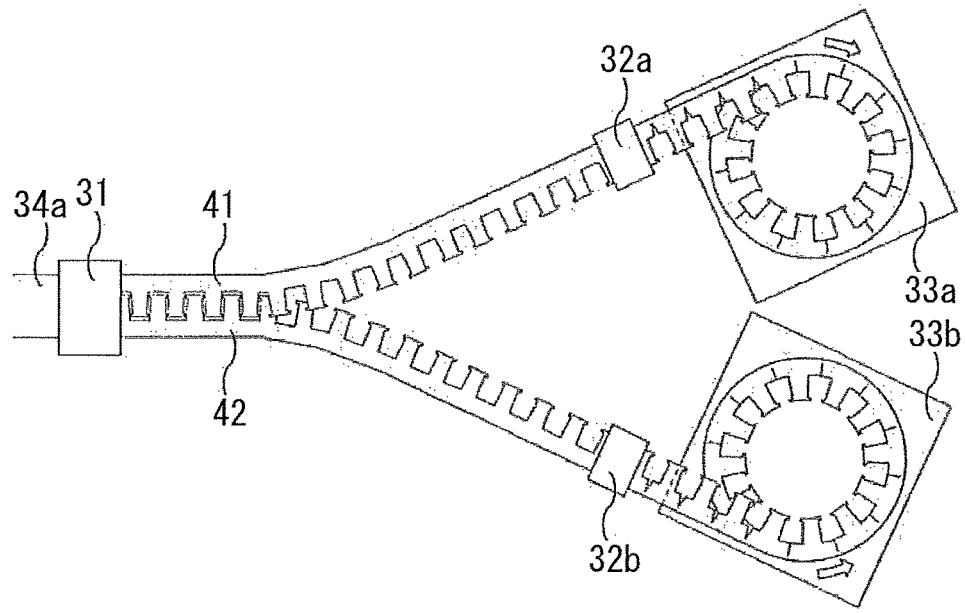
FIG. 7A is a schematic view of an example (first disposition example) of a manufacturing apparatus of a helical core for a rotating electrical machine that includes a plurality of helical processing units when the example is viewed from the above in a vertical direction.
Figure 7B:
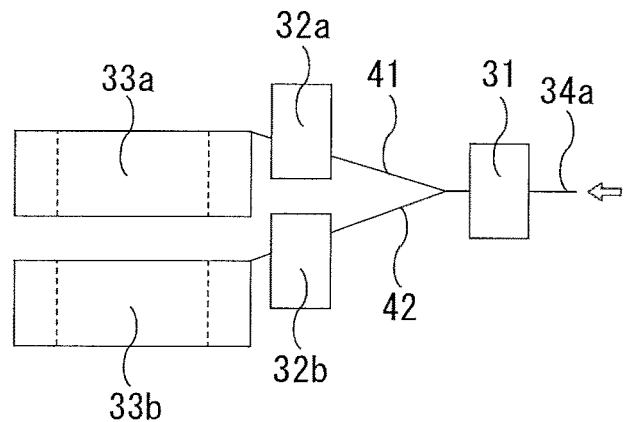
FIG. 7B is a schematic view of an example (second disposition example) of a manufacturing apparatus of a helical core for a rotating electrical machine that includes a plurality of helical processing units when the example is viewed from a horizontal direction.
Figure 7C:
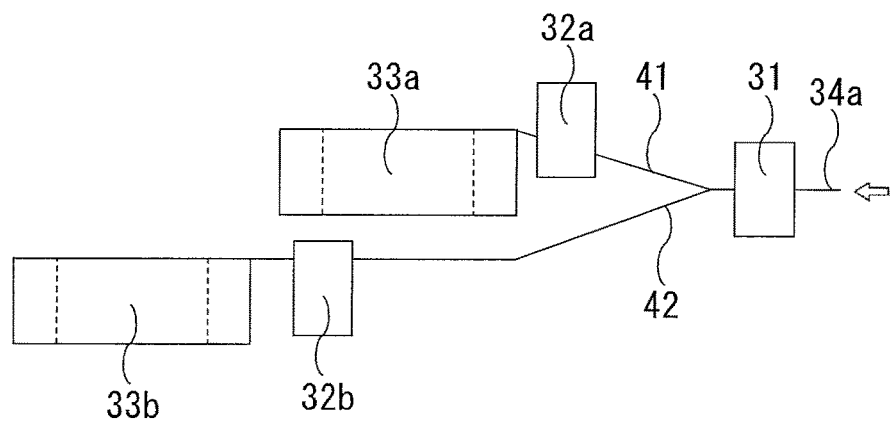
FIG. 7C is a schematic view of an example (third disposition example) of a manufacturing apparatus of a helical core for a rotating electrical machine that includes a plurality of helical processing units when the example is viewed from a horizontal direction.

Moreover, in the present embodiment, when the plurality of the belt-shaped steel sheets 41 and 42 are formed from the one rectangular belt-shaped steel sheet 34*a* as shown in FIG. 4A, for example, as shown in FIGS. 7A to 7C, the manufacturing apparatus of the helical core for a rotating electrical machine may include a plurality of helical processing units 33 (33*a* and 33*b*) and a plurality of notch processing units 32 (32*a* and 32*b*). FIG. 7A is a schematic view of an example (first disposition example) of the manufacturing apparatus of the helical core for a rotating electrical machine that includes the plurality of helical processing units when the example is viewed from the above in a vertical direction. In FIG. 7A, two helical processing units 33*a* and 33*b* are disposed to be lined up in the horizontal direction, and each notch processing unit 32*a* (32*b*) is disposed immediately before a corresponding helical processing unit 33*a* (33*b*). Moreover, the belt-shaped steel sheets 41 and 42 that are formed by the shape processing unit 31 are separated respectively, and are transported in directions different from each other. The belt-shaped steel sheet 41 (42) is processed by the notch processing unit 32*a* (32*b*) and the helical processing unit 33*a* (33*b*), and the helical core is manufactured. FIG. 7B is a schematic view of an example (second disposition example) of the manufacturing apparatus of the helical core for a rotating electrical machine that includes the plurality of helical processing units when the example is viewed from a horizontal direction. In FIG. 7B, two helical processing units 33*a* and 33*b* are disposed to be lined up in the vertical direction, and each notch processing unit 32*a* (32*b*) is disposed immediately before each helical processing unit 33*a* (33*b*). In this case, for example, since the centers of the helical cores can be aligned, the same power can be used for the helical processing unit 33*a* and 33*b*. Moreover, as shown in FIG. 7C, one helical processing unit in FIG. 7B may be deviated in the horizontal direction. If the disposition method satisfies a condition in which the belt-shaped steel sheet is not deformed before the belt-shaped steel sheet reaches the helical processing unit 33 (for example, the distance from the notch processing unit 32*a* (32*b*) to the helical processing unit 33*a* (33*b*) is within a predetermined dimension), the disposition method of two helical processing unit is not particularly limited.

Furthermore, in the above-described disposition example, since each of the belt-shaped steel sheets 41 and 42 is separated and is transported in directions different from each other, if the transport distance from the shape processing unit to the helical processing unit is short, each of the belt-shaped steel sheets 41 and 42 is deformed, and the magnetic characteristics and the shape of the helical core may be deteriorated. Thereby, in order to sufficiently decrease an angle between the transport directions when each of the belt-shaped steel sheets 41 and 42 is separated, it is preferable that the transport distance from the shape processing unit 31 to the helical processing unit 33 be a predetermined value or more. As described above, when the yoke portion 22, the tooth portion 23, and the notch portion 24 are formed on the belt-shaped steel sheet at a time, since stiffness of the belt-shaped steel sheet is small, the belt-shaped steel sheet is deformed before the belt-shaped steel sheet reaches the helical processing unit, and the magnetic characteristics and the shape of the helical core are deteriorated. In this case, if the plurality of belt-shaped steel sheets 41 and 42 are formed from the one rectangular belt-shaped steel sheet 34*a*, the transport distance from the shape processing unit 31 to the helical processing unit 33 is increased. Accordingly, in the present disposition example, as shown FIGS. 7A to 7C, the plurality of notch processing units 32 (32*a* and 32*b*) are needed in addition to the shape processing unit 31, each notch processing unit 32 is disposed in the position within a predetermined distance (predetermined dimension) from each of the helical processing unit 33 (33*a* and 33*b*). In this case, the one belt-shaped steel sheet can be formed from the one rectangular belt-shaped steel sheet 34*a* by changing the line, and production quantity can be flexibly adjusted. Moreover, by appropriately adding the helical processing unit 33 and the notch processing unit 32 corresponding to the helical processing unit, the plurality belt-shaped steel sheets having different shapes can be formed from the one rectangular belt-shaped steel sheet 34*a*. In this case, for example, the helical cores having different diameters can be manufactured by adding different kinds of the helical processing units 33 (33*b*). In this way, the manufacturing method and the manufacturing apparatus of the helical core for a rotating electrical machine of the present embodiment can correspond to the helical cores (belt-shaped steel sheets) having various shapes.

As described above, in the present embodiment, after the yoke portion 22 and the tooth portion 23 are formed by the shape processing unit 31, the notch portion 24 is formed by the notch processing unit 32 at the position immediately before the belt-shaped steel sheet is processed into a helical shape, and the belt-shaped steel sheet is processed into a helical shape while curvature is sequentially applied to the belt-shaped steel sheet from the portion on which the notch portion 24 is formed, at the position within the predetermined distance (predetermined dimension) from the position at which the notch portion 24 is formed. Accordingly, bending of the belt-shaped steel sheet due to existence of the notch portion 24 can be prevented as much as possible before the belt-shaped steel sheet is processed into a helical shape.

Furthermore, in the helical core that is manufactured by the manufacturing method of the helical core for a rotating electrical machine of the present embodiment, the belt-shaped steel sheet 21 when the helical core for a rotating electrical machine is formed includes the rectangular yoke portion 22, a tooth portion 23 that protrudes at equal intervals from one end in the width direction of the yoke portion 22, and the notch portion 24. The notch portion 24 is formed at the position which is the middle between tooth portions 23 adjacent to each other at the end (the one end) of the side in which the tooth portion 23 of the yoke portion 22 is formed. Moreover, when the belt-shaped steel sheet 21 is processed into a helical shape, the oblique lines 26 and 27 of the notch portion 24 opposite to each other are aligned to each other. In the stator 11 (the helical core for a rotating electrical machine), it is possible to prevent the thickness of the outer circumferential side of the yoke from being thinner than the thickness of the inner circumferential side. Furthermore, when the belt-shaped steel sheet 21 is processed into a helical shape, stress can be more concentrated at the outer circumferential side region 25 of the yoke portion 22 (yoke) than at the notch portion 24 (cut line 15).

Accordingly, in the above-described helical core, unlike the related art, it is not necessary to perform a specific treatment after processing the belt-shaped steel sheet into a helical shape, or to process the shape of the belt-shaped steel sheet processed into a helical shape in a complicated shape. Moreover, in the manufacturing method of the helical core for a rotating electrical machine of the present embodiment, the helical core for a rotating electrical machine having improved characteristics (for example, the helical core for a rotating electrical machine excellent at accuracy of the dimensions such as circularity or the thickness or the magnetic characteristics) can be obtained, and costs of the helical core for a rotating electrical machine can be decreased. Furthermore, since the belt-shaped steel sheet 41 shown in FIG. 4A can be formed, the unnecessary portions of the rectangular belt-shaped steel sheet 34a can be further decreased, and the costs of the helical core for a rotating electrical machine can be further decreased.

Moreover, in the manufacturing method and the manufacturing apparatus of the helical core for a rotating electrical machine described in the present embodiment, not only the stator of the rotating electrical machine but also the helical core used in the rotor can be manufactured.

Furthermore, the above-described embodiment of the present invention is only an embodied example for carrying out the present invention, and accordingly, the technical scope of the present invention should not be interpreted restrictively. That is, the present invention may be carried out in various forms without departing from the main characteristics thereof.

Example 1

The belt-shaped steel sheet having the shape shown in FIG. 2A was prepared using a product hoop of SPCC-SD (0.02% C) defined by JIS G3141 and 0.50 mm thickness and a magnetic steel sheet product hoop of 0.002% C, 0.1% Si, and 0.35 mm thickness, and a helical core stator of 30 mm thickness was manufactured. In the helical core stator, the outer diameter of the stator was 120 mmφ, and the inner diameter (the inner diameter that includes the bottom of the slot) of the tooth root portion was 90 mmφ. Moreover, the depth dimensions of the cut line 15 shown in FIG. 1 were variously changed with respect to the length (width dimension) in the width direction of the yoke (hereinafter, the depth dimension of the cut line 15 with respect to the length in the width direction of the yoke is referred to as a ratio of the notch portion). Furthermore, an integral round-punched core was also prepared as Comparative Example. Evaluation results of the ratio of the notch portion and the shape of the steel sheet of the region 25 (stress concentrated portion) shown in FIG. 2B are shown in Table 1 (SPCC-SD) and Table 2 (magnetic steel sheet) with respect to helical core stators that are manufactured from each product hoop. In the stress concentrated portions of Tables 1 and 2, a case where the notch portion was not formed was set to "0", a case where the notch portion having the ratio of the notch portion of 0.9 was formed was set to "10", and the evaluations were performed by 10 levels according to ratios (shapes) that were improved by the formation of the notch portion. It is shown that the larger the number is, the better the shape of the stress concentrated portion is. From Tables 1 and 2, it is understood that the shape of the steel sheet of the region 25 (stress concentrated portion) is good when the notch portion is formed on the yoke portion. Particularly, when the ratios of the notch portion were changed to 0.5, 0.75, and 0.80 respectively, the shape of the stress concentrated portion was improved largely. Furthermore, Tables 1 and 2 also show a relationship between the ratio of the notch portion and the yield ("excellent" or "bad") of the stator. Moreover, compared to a case where the round-punched core was made from each product hoop, the yield of the stator was good in the case where the helical core was prepared. Furthermore, since the notch processing unit was disposed immediately before the helical processing unit, even though the notch portion was formed on the yoke portion and the ratio of the notch portion was increased, the yield of the stator was good.

TABLE 1

| No. | Ratio of the notch portion | Shape of the stress concentrated portion | Yield |
| --- | --- | --- | --- |
| 1 | 0 | 0 | Excellent |
| 2 | 0.2 | 2 | Excellent |
| 3 | 0.4 | 4 | Excellent |
| 4 | 0.5 | 7 | Excellent |
| 5 | 0.75 | 9 | Excellent |
| 6 | 0.8 | 10 | Excellent |
| 7 | 0.9 | 10 | Excellent |
| 8 | Round-punched stator core | | Bad |

TABLE 2

| No. | Ratio of the notch portion | Shape of the stress concentrated portion | Yield |
| --- | --- | --- | --- |
| 1 | 0 | 0 | Excellent |
| 2 | 0.2 | 2 | Excellent |
| 3 | 0.4 | 4 | Excellent |
| 4 | 0.5 | 7 | Excellent |
| 5 | 0.75 | 9 | Excellent |
| 6 | 0.8 | 10 | Excellent |
| 7 | 0.9 | 10 | Excellent |
| 8 | Round-punched stator core | | Bad |

Example 2

The belt-shaped steel sheet having the shape shown in FIG. 2A was prepared using a product hoop of 35A210 (3.1% Si) defined by JIS C2552 and 0.35 mm thickness, and a helical core stator of 30 mm thickness was manufactured. In the helical core stator, the outer diameter of the stator was 200 mmφ, and the inner diameter of the tooth root portion was 180 mmφ. Moreover, the depth dimensions of the cut line 15 shown in FIG. 1 were variously changed with respect to the length in the width direction of the yoke (hereinafter, the depth dimension of the cut line 15 with respect to the length in the width direction of the yoke is referred to as a ratio of the notch portion). Furthermore, an integral round-punched core was also prepared as Comparative Example. Evaluation results of the ratio of the notch portion and the shape of the steel sheet of the region 25 (stress concentrated portion) shown in FIG. 2B are shown in Table 3. The evaluation method was performed using the same criteria as that of Example 1. From Table 3, it is understood that the shape of the steel sheet of the region 25 (stress concentrated portion) is good when the notch portion is formed on the yoke portion. Particularly, when the ratios of the notch portion were changed to 0.5, 0.75, and 0.80 respectively, the shape of the stress concentrated portion was improved largely. Moreover, compared to a case where the round-punched core was made from the product hoop, the yield of the stator was good in the case where the helical core was prepared. Furthermore, since the notch processing unit was disposed immediately before the helical processing unit, even though the notch portion was formed on the yoke portion and the ratio of the notch portion was increased, the yield of the stator was good.

TABLE 3

| No. | Ratio of the notch portion | Shape of the stress concentrated portion | Yield |
| --- | --- | --- | --- |
| 1 | 0 | 0 | Excellent |
| 2 | 0.2 | 2 | Excellent |
| 3 | 0.4 | 4 | Excellent |
| 4 | 0.5 | 7 | Excellent |
| 5 | 0.75 | 9 | Excellent |
| 6 | 0.8 | 10 | Excellent |
| 7 | 0.9 | 10 | Excellent |
| 8 | Round-punched stator core | | Bad |

Example 3

The belt-shaped steel sheet having the shape shown in FIG. 6A was prepared using a product hoop of 50A470 (2.0% Si) defined by JIS C2552 and 0.50 mm thickness and a product hoop of 50A800 (0.8% Si) defined by JIS C2552 and 0.50 mm thickness, and a helical core stator of 30 mm thickness was manufactured. In the helical core stator, the outer diameter of the stator was 120 mmφ, and the inner diameter of the tooth root portion was 90 mmφ. Moreover, the depth dimensions of the cut line 52 shown in FIG. 5 were variously changed with respect to the length in the width direction of the yoke (hereinafter, the depth dimension of the cut line 15 with respect to the length in the width direction of the yoke is referred to as a ratio of the notch portion). Furthermore, an integral round-punched core was also prepared as Comparative Example. Evaluation results of the ratio of the notch portion and the shape of the steel sheet of the stress concentrated portion near the circular portion of the notch portion 62 shown in FIG. 6B are shown in Table 4 (50A470) and Table 5 (50A800) with respect to helical core stators that are manufactured from each product hoop. The evaluation method was performed using the same criteria as that of Example 1. From Tables 4 and 5, it is understood that the shape of the steel sheet of the stress concentrated portion near the circular portion of the notch portion 62 is good when the notch portion 62 is formed on the yoke portion. Particularly, when the ratios of the notch portion were changed to 0.5, 0.75, and 0.80 respectively, the shape of the stress concentrated portion was improved largely. Moreover, compared to a case where the round-punched core was made from a product hoop, the yield of the stator was good in the case where the helical core was prepared. Furthermore, since the notch processing unit was disposed immediately before the helical processing unit, even though the notch portion was formed on the yoke portion and the ratio of the notch portion was increased, the yield of the stator was good.

TABLE 4

| No. | Ratio of the notch portion | Shape of the stress concentrated portion | Yield |
| --- | --- | --- | --- |
| 1 | 0 | 0 | Excellent |
| 2 | 0.2 | 2 | Excellent |
| 3 | 0.4 | 4 | Excellent |
| 4 | 0.5 | 7 | Excellent |
| 5 | 0.75 | 9 | Excellent |
| 6 | 0.8 | 10 | Excellent |
| 7 | 0.9 | 10 | Excellent |
| 8 | Round-punched stator core | | Bad |

TABLE 5

| No. | Ratio of the notch portion | Shape of the stress concentrated portion | Yield |
| --- | --- | --- | --- |
| 1 | 0 | 0 | Excellent |
| 2 | 0.2 | 2 | Excellent |
| 3 | 0.4 | 4 | Excellent |
| 4 | 0.5 | 7 | Excellent |
| 5 | 0.75 | 9 | Excellent |
| 6 | 0.8 | 10 | Excellent |
| 7 | 0.9 | 10 | Excellent |
| 8 | Round-punched stator core | | Bad |

Example 4

The yoke portion and the tooth portion were formed on the belt-shaped steel sheet by a die (punch) of a first stage using the same product hoops as Example 1 (SPCC-SD and magnetic steel sheet), and two belt-shaped steel sheets as shown in FIG. 4A were prepared. Moreover, after the notch portion shown in FIG. 2A was formed with respect to each belt-shaped steel sheet by two dies of a second stage, two helical core stators of 30 mm thickness were manufactured by two nonuniform pressure rolls. In the helical core stator, the outer diameter of the stator was 120 mmφ, and the inner diameter (the inner diameter that includes the bottom of the slot) of the tooth root portion was 90 mmφ. Furthermore, the ratio of the notch portion was set to 0.5. Moreover, the distance from the die forming the notch portion to the nonuniform pressure roll performing the helical processing was variously changed, and the helical core was manufactured. Furthermore, in the manufacturing apparatus of the helical core, the distances from the dies of the first stage to the nonuniform pressure rolls were set to be the same distance in two lines. Moreover, one line of the manufacturing apparatus of the same helical core as the above was selected, and the belt-shaped steel sheet, in which the shape of one sheet was processed as shown in FIG. 4B, was also prepared. Furthermore, as Comparative Example, a helical core was prepared with a condition (condition in which a die was not disposed as the notch processing unit) in which the yoke portion, the tooth portion, and the notch portion were simultaneously formed using a die. In this case, in order to prepare two belt-shaped steel sheets that were shape-processed from one belt-shaped steel sheet and smoothly introduce the steel sheets into two nonuniform pressure rolls, the distance from the die to the nonuniform pressure rolls needed to be at least 2500 mm. Thereby, in this case, the distance from the die to the nonuniform pressure rolls was set to 2500 mm.

Evaluation results of the distance from the die forming the notch portion to the nonuniform pressure rolls, the shape of the helical core, and magnetic characteristics are shown in Table 6 (SPCC-SD) and Table 7 (magnetic steel sheet) with respect to helical core stators that are manufactured from each product hoop. Moreover, in the evaluation method of the shape of the helical core and the magnetic characteristics, a case where the yoke portion, the tooth portion, and the notch portion were simultaneously formed using the die (a case where the die for the notch processing unit was not present) was set to "0", a case where the distance from the die (notch processing unit) forming the notch portion to the nonuniform pressure roll (helical processing unit) was 20 mm was set to "10", the evaluations were performed by 10 levels according to ratios (shape and magnetic characteristics) that were improved by decreasing the distance between the die forming the notch portion and the nonuniform pressure rolls. It is shown that the larger the number is, the better the shape and magnetic characteristics of the helical core are. From Tables 6 and 7, compared to the case where the die, which simultaneously formed the yoke portion, the tooth portion, and the notch portion, was used, the shape and the magnetic characteristics of the helical core were improved largely in the case where the die forming the yoke portion and the tooth portion and the die forming the notch portion were used. Particularly, when the distance between the die forming the notch portion and the nonuniform pressure roll was changed to 1000 mm, 500 mm, and 300 mm, the shape and the magnetic characteristics of the helical core were largely improved. Furthermore, Tables 6 and 7 also show a relationship between the distance from the die forming the notch portion to the nonuniform pressure roll and the yield ("excellent", "good", or "bad") of the stator. The yield of the stator was good at all conditions, and the yield was further improved by preparing two belt-shaped steel sheet from one belt-shaped steel sheet.

TABLE 6

| No. | Application of the die forming the notch portion | Number of helical core produced | Distance from the die forming the notch portion to the nonuniform pressure rolls | Shape of the helical core | Yield | Magnetic characteristics |
|---|---|---|---|---|---|---|
| 1 | Yes | 2 | 20 | 10 | Excellent | 10 |
| 2 | Yes | 2 | 100 | 10 | Excellent | 10 |
| 3 | Yes | 2 | 300 | 10 | Excellent | 10 |
| 4 | Yes | 2 | 400 | 9 | Excellent | 9 |
| 5 | Yes | 2 | 500 | 7 | Excellent | 7 |
| 6 | Yes | 2 | 750 | 5 | Excellent | 5 |
| 7 | Yes | 2 | 1000 | 4 | Excellent | 4 |
| 8 | Yes | 2 | 2000 | 1 | Excellent | 1 |
| 9 | Yes | 2 | 2500 | 0 | Excellent | 0 |
| 10 | Yes | 1 | 1000 | 3 | Good | 3 |
| 11 | No | 2 | 2500 | 0 | Excellent | 0 |

TABLE 7

| No. | Application of the die forming the notch portion | Number of helical core produced | Distance from the die forming the notch portion to the nonuniform pressure rolls | Shape of the helical core | Yield | Magnetic characteristics |
|---|---|---|---|---|---|---|
| 1 | Yes | 2 | 20 | 10 | Excellent | 10 |
| 2 | Yes | 2 | 100 | 10 | Excellent | 10 |
| 3 | Yes | 2 | 300 | 10 | Excellent | 10 |
| 4 | Yes | 2 | 400 | 9 | Excellent | 9 |
| 5 | Yes | 2 | 500 | 7 | Excellent | 7 |
| 6 | Yes | 2 | 750 | 5 | Excellent | 5 |
| 7 | Yes | 2 | 1000 | 4 | Excellent | 4 |
| 8 | Yes | 2 | 2000 | 1 | Excellent | 1 |
| 9 | Yes | 2 | 2500 | 0 | Excellent | 0 |
| 10 | Yes | 1 | 1000 | 3 | Good | 3 |
| 11 | No | 2 | 2500 | 0 | Excellent | 0 |

INDUSTRIAL APPLICABILITY

According to the present invention, magnetic characteristics, yield, and production flexibility of a helical core for a rotating electrical machine are increased, and costs of the helical core for a rotating electrical machine can be further decreased than the related art.

REFERENCE SIGNS LIST 10, 50 rotating electrical machine
11, 51 stator
12 rotor
13 case
14 rotating shaft
15 cut line
21, 61 belt-shaped steel sheet
22 yoke portion
23 tooth portions
24, 62 notch portion (notch)
31 shape processing unit (first processing unit)
32 notch processing unit (second processing unit)
33 helical processing unit
37 guide
38 heating unit
39 stress relief heating unit
52 cut line
53 hole

The invention claimed is:

1. A manufacturing method of a helical core for a rotating electrical machine, the method comprising:
    forming a yoke portion and a plurality of tooth portions protruding toward a width direction of the yoke portion from a first side edge of the width direction;
    forming a notch by punching processing at a position between the tooth portions of the yoke portion, wherein the yoke portion, the plurality of tooth portions and the notch are formed on a belt-shaped metal plate;
    heating the belt-shaped metal plate; and
    bending the heated belt-shaped metal plate from a linear configuration into a helical shape so that the belt-shaped metal plate is curved toward the width direction sequentially from a portion in which the notch is formed,
    wherein, during bending, a distance between a position at which application of the bending starts and a position at which the notch is formed is set to be 10 mm or more and 1000 mm or less.

2. The manufacturing method of the helical core for a rotating electrical machine according to claim 1, the method further comprising,
    performing stress relief annealing by heating the belt-shaped metal plate during or after the bending of the heated belt-shaped metal plate.

3. The manufacturing method of the helical core for a rotating electrical machine according to claim 1,
    wherein a depth dimension of the notch is 1/2 times or more of a width dimension of the yoke portion and is less than the width dimension of the yoke portion.

4. The manufacturing method of the helical core for a rotating electrical machine according to claim 1,
    wherein a shape on a plate surface of the notch is an isosceles triangle or an equilateral triangle that includes a base on the first side edge in the width direction of the yoke portion.

5. The manufacturing method of the helical core for a rotating electrical machine according to claim 1,
    wherein a shape on a plate surface of the notch is a shape in which a circle or an ellipse is added to a vertical angle of an isosceles triangle or an equilateral triangle that includes a base on the first side edge in the width direction of the yoke portion.

6. The manufacturing method of the helical core for a rotating electrical machine according to claim 1,
    wherein at least a portion of a second edge in the width direction of the yoke portion is linear.

* * * * *

UNITED STATES PATENT AND TRADEMARK OFFICE
CERTIFICATE OF CORRECTION

| | | |
|---|---|---|
| PATENT NO. | : 9,647,517 B2 | Page 1 of 1 |
| APPLICATION NO. | : 13/995280 | |
| DATED | : May 9, 2017 | |
| INVENTOR(S) | : Yousuke Kurosaki | |

It is certified that error appears in the above-identified patent and that said Letters Patent is hereby corrected as shown below:

On the Title Page

Please delete the following:

"(30)      Foreign Application Priority Data

Oct. 7, 2009 (JP) .................. 2009-233774

Feb. 22, 2010 (JP) ................ 2010/036375".

Signed and Sealed this
Twelfth Day of December, 2017

Joseph Matal
*Performing the Functions and Duties of the
Under Secretary of Commerce for Intellectual Property and
Director of the United States Patent and Trademark Office*